United States Patent [19]

Everhard, Jr.

[11] 3,808,548

[45] Apr. 30, 1974

[54] BROADBAND SINGLE-SIDEBAND VARIABLE FREQUENCY GENERATOR

[75] Inventor: Frederic U. Everhard, Jr., Pelham, N.H.

[73] Assignee: The United States of America as represented by the Secretary of the Army, Washington, D.C.

[22] Filed: Apr. 16, 1973

[21] Appl. No.: 351,409

[52] U.S. Cl. ........................ 331/38, 328/15, 331/40

[51] Int. Cl. ........................................... H03b 21/02

[58] Field of Search ............ 331/37, 38, 40; 328/15

[56] References Cited

UNITED STATES PATENTS

| | | | |
|---|---|---|---|
| 3,184,690 | 5/1965 | Garland | 331/40 X |
| 3,248,652 | 4/1966 | Kruse | 331/38 X |

*Primary Examiner*—Herman Karl Saalbach

*Assistant Examiner*—Siegfried H. Grimm

*Attorney, Agent, or Firm*—Edward J. Kelly; Herbert Berl; Aubrey J. Dunn

[57] ABSTRACT

A frequency generator wherein a first precision high-frequency wave is modulated by lower frequency waves, with the modulated wave therefrom being phase-shifted in two phase shifters. The phase-shifted waves are then demodulated and used to single side-band modulate two phase-shifted signals from a second precision high-frequency wave. The carrier (second precision high-frequency wave) is suppressed, and signals are provided, which signals are sums of the lower frequency waves and the second precision high-frequency wave. All phase shifting is thus accomplished near a center frequency, and phase distortions are minimized. Moreover the lower frequency waves need not be as frequency-precise as the high-frequency waves, for frequency-precise outputs to be provided.

5 Claims, 1 Drawing Figure

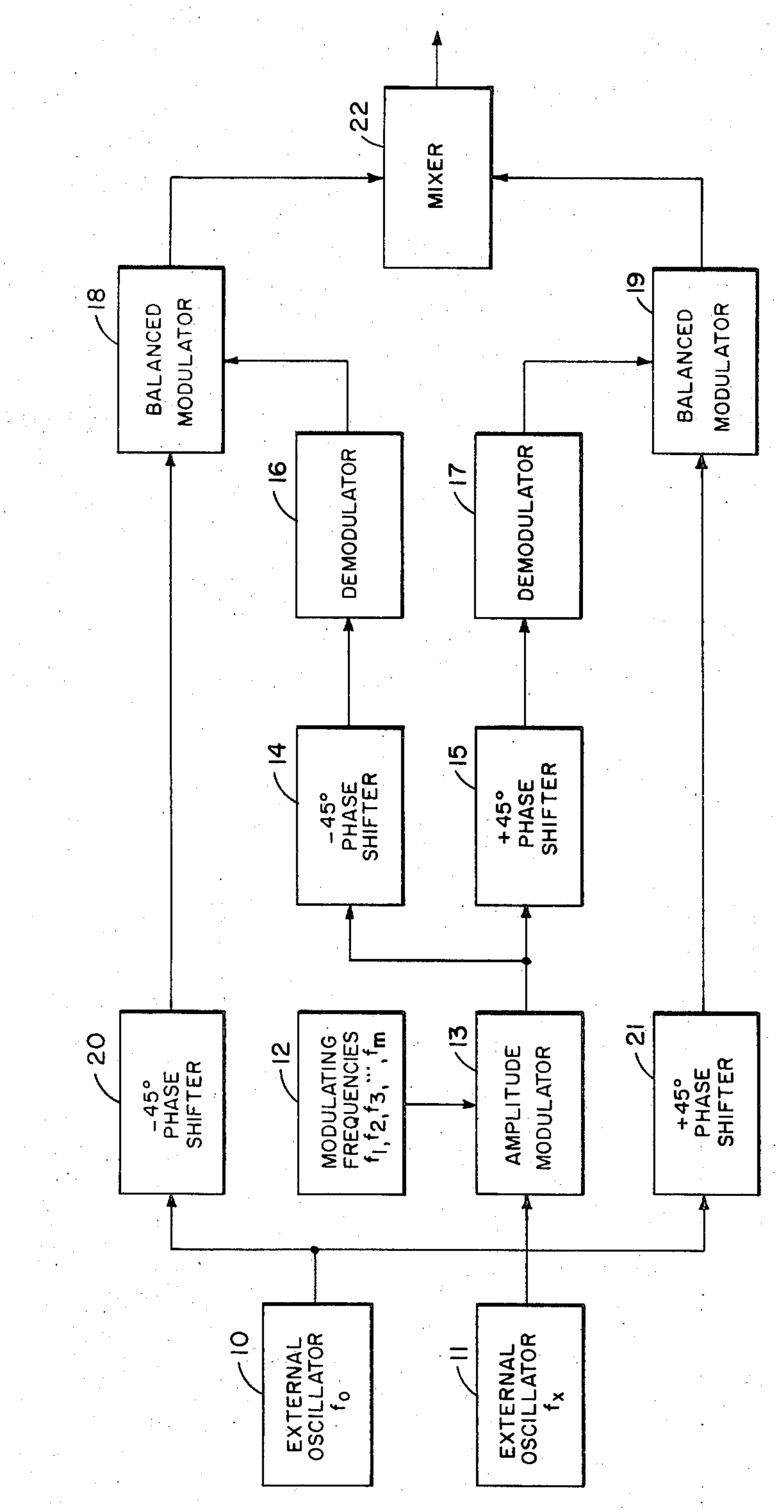
EXTERNAL OSCILLATOR $f_o$
10
EXTERNAL OSCILLATOR $f_x$
11
MODULATING FREQUENCIES $f_1, f_2, f_3, \cdots, f_m$
12
AMPLITUDE MODULATOR
13
-45° PHASE SHIFTER
14
+45° PHASE SHIFTER
15
DEMODULATOR
16
DEMODULATOR
17
BALANCED MODULATOR
18
BALANCED MODULATOR
19
-45° PHASE SHIFTER
20
+45° PHASE SHIFTER
21
MIXER
22

BROADBAND SINGLE-SIDEBAND VARIABLE FREQUENCY GENERATOR

BACKGROUND OF THE INVENTION

Various methods are known whereby a frequency generator can provide a number of precision frequency waves. The most obvious such system is perhaps a generator using individual crystals for each frequency wherein an accuracy of 0.01 percent may be approached. Where a large number of discrete frequencies are required, such as in an IF amplifier bandpass test, the number of crystals required becomes prohibitive. In addition, the switching matrix necessary to select numerous crystals becomes complex. If changes in the discrete frequencies are required, additional crystals must be substituted; such crystals are normally expensive and require long-lead procurement times. The instant invention requires only two crystals, whose waves are suppressed in the output of the invention. The frequencies used to modulate these waves can be at least one order of magnitude less precise than the crystal frequencies.

SUMMARY OF THE INVENTION

The invention is a frequency generator using sidebands from a first suppressed-carrier, precision high-frequency wave. The sidebands are generated from low-frequency waves amplitude modulated on a second precision high-frequency wave; the modulated wave is split and phase shifted in first and second phase shifters; the phase-shifted waves are then demodulated and used to single-sideband modulate two phase-shifted waves derived from the first high-frequency wave. The single-sideband signals are carrier suppressed and are sums of the first high-frequency wave and the low-frequency waves. The system is similar to a single-sideband system except for the manner in which the modulating signals are phase shifted.

BRIEF DESCRIPTION OF THE DRAWING

The single drawing FIGURE shows a schematic diagram of the invention.

DETAILED DESCRIPTION OF THE INVENTION

The invention may be best understood by reference to the single drawing FIGURE, wherein numeral 10 designates a high-precision oscillator. Another oscillator, 11, also is high-precision. Oscillators 10 and 11 may both be crystal controlled to provide the needed respective precision frequencies $f_o$ and $f_x$. The output of 11 acts as a carrier for modulating frequencies $f_1, f_2, f_3, \ldots f_m$ from oscillator 12, with modulation of $f_x$ by $f_m$ occuring in modulator 13. The output of 13 passes through first and second phase shifters 14 and 15; these shifters respectively provide −45° and +45° shifts of $f_x$. The frequency of $f_x$ is so chosen that it is much greater than any one of $f_m$. The sidebands produced by $f_m$ will thus have frequencies very close to $f_x$. The modulated wave can be represented as follows by the well-known formula for a wave with single sine-wave amplitude modulation:

$$y = A_x \cos \omega_x t + a_m/2 \cos(\omega_x + \omega_m)t + a_m/2 \cos(\omega_x - \omega_m)t$$

where $A_x$ equals the amplitude of unmodulated $f_x$, $a_m$ equals the amplitude of $f_m$, $\omega_x$ equals $2\pi f_x$, and $\omega_m$ equals $2\pi f_m$.

The 90° phase shift introduced by 14 and 15 is equivalent to differentiating $f_x$. Therefore $y$ will appear as a sinusoidal signal after experiencing 90° phase shift. Thus:

$$dy/dt = -A_x/\omega_x \sin \omega_x t - a_x \sin(\omega_x + \omega_m)t/2(\omega_x + \omega_m) - a_m \sin(\omega_x - \omega_m)t/2(\omega_x - \omega_m).$$

Since $\omega_x$ is much greater than $\omega_m$, $(\omega_x \pm \omega_m)$ can be approximated by $\omega_x$ and the equation can be written:

$$-\omega_x\, dy/dt = A_x \sin \omega_x t + a_m/2 \sin(\omega_x + \omega_m)t + a_m/2 \sin(\omega_x - \omega_m)t.$$

Any $f_m$ modulated on $f_x$ will be phase-shifted substantially the same amount as $f_x$. The outputs of 14 and 15 are respectively demodulated in demodulators 16 and 17. The outputs of 16 and 17 act as modulating inputs to respective balanced modulators 18 and 19.

Output $f_o$ of oscillator 10 is applied to respective phase shifters 20 and 21. The outputs of 20 and 21 respectively act as carrier inputs to balanced modulators 18 and 19. The outputs of 18 and 19 are mixed in mixer 22 to provide a single-sideband, suppressed carrier wave. This wave will be at a frequency $f_o + f_m$ for the schematic diagram as shown; $f_o - f_m$ can readily be obtained by switching the outputs of 14 and 15 respectively to 17 and 16 instead of 16 and 17 as shown. The frequency $f_o$ is so chosen that $f_o + f_m$ or $f_o - f_m$ is at the desired frequency. This technique for obtaining a single-sideband, suppressed carrier wave signal is known in the art, as shown in FIG. 15–14 of the book "Electronic and Radio Engineering," Fourth Edition, by F. E. Terman. This book bears a 1955 copyright date and Library of Congress Catalog Card Number 55-6174.

A system has thus been shown wherein signals are provided at greater precisions than possible with simple tuned circuit oscillators, but at less complexity and expense than crystal controlled oscillators. Since phase shifters 14, 15, 20 and 21 are shifting only frequencies near a central frequency (in the case of 14 and 15) and only a single frequency (in the case of 20 and 21), these shifters can easily be chosen for precision phase-shifting. The difficulty in phase-shifter selection or design arises when a shifter is required to precisely phase-shift over a wide frequency band, as might be the case if $f_m$ were fed directly into 18 and 19, as is the usual case in single-sideband modulators. Obviously, oscillator 12 is so constructed that any one of $f_1, f_2, f_3 \ldots f_m$ may be readily chosen, as by switched impedances in the tank circuit of 12. Although not shown, it should be understood that the invention must include a power supply for the various "boxes" of the diagram. Each and every one of these "boxes" is old and well known in the art and their particular contents in no way limit the invention. The invention may be used as follows: one determines the frequencies that one desires as outputs of the invention; one then selects, depending on which one wishes to regard as a reference, one of $f_o$ or $f_m$; the other one of this set is then chosen so that $f_o - f_m$ equals the desired frequency; oscillator 11 is then chosen so that $f_x$ is much greater than $f_m$ (a hundred or more times greater should be sufficient); "boxes" 20, 21, 14, 15, 13, 16, 17, 18, 19 and 22 are then chosen to match the frequencies chosen for $f_o$, $f_x$, and $f_m$.

While a specific embodiment of the invention has been shown and described, other embodiments may be made by one skilled in the art without departing from the spirit of this invention. For example, the pairs of shifters 16–17, and 20–21 may each be replaced by a single respective 90° phase shifter.

I claim:

1. A broadband single-sideband frequency generator including first and second oscillators each having an output; first and second balanced modulators each having inputs and an output; first phase-shifting means connected between said first oscillator output and one input of each of said balanced modulators; a third oscillator having an output; an amplitude modulator having inputs and an output, said outputs of said second and third oscillators connected to respective inputs of said amplitude modulator; first and second demodulators each having an input and each having a respective output connected to a respective input of a respective balanced modulator; second phase-shifting means connected between said output of said amplitude modulator and said inputs of said demodulators; and mixer means having inputs and an output, with said outputs of said balanced modulators connected to respective inputs of said mixer.

2. The generator as defined in claim 1 wherein said third oscillator is frequency variable.

3. The generator as defined in claim 2 wherein said second oscillator has a frequency at least one hundred times as great as the greatest frequency of said third oscillator.

4. The generator as defined in claim 3 wherein said inputs of said amplitude modulator are carrier wave and modulating wave inputs, and said outputs of said second and third oscillators are respectively connected to said carrier wave and said modulating wave inputs; said inputs of said balanced modulators are carrier wave and modulating wave inputs, and said first phase-shifting means is connected between the output of said first oscillator and said carrier wave inputs of said balanced modulators, and said outputs of demodulators are connected to said modulating wave inputs of said balanced modulators; and whereby said mixer has an output of frequencies of the sum of the frequencies of said first and third oscillators.

5. The generator as defined in claim 4 wherein said first and second phase-shifting means each provide first and second output signals, with said signals being 90° phase-displaced with each other.

* * * * *